(12) United States Patent
McKibben et al.

(10) Patent No.: US 12,375,440 B1
(45) Date of Patent: Jul. 29, 2025

(54) SYSTEMS AND METHODS FOR OBTAINING PERMANENT MAC ADDRESSES

(71) Applicant: CABLE TELEVISION LABORATORIES, INC, Louisville, CO (US)

(72) Inventors: Bernard McKibben, Golden, CO (US); Tao Wan, Ottowa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 202 days.

(21) Appl. No.: 18/222,983

(22) Filed: Jul. 17, 2023

Related U.S. Application Data

(62) Division of application No. 16/941,328, filed on Jul. 28, 2020, now Pat. No. 11,706,255.

(60) Provisional application No. 62/879,953, filed on Jul. 29, 2019.

(51) Int. Cl.
| | | |
|---|---|---|
| *H04L 29/12* | (2006.01) | |
| *H04L 9/40* | (2022.01) | |
| *H04L 61/103* | (2022.01) | |
| *H04W 12/06* | (2021.01) | |
| *H04W 12/122* | (2021.01) | |
| *H04L 101/622* | (2022.01) | |

(52) U.S. Cl.
CPC ........ *H04L 61/103* (2013.01); *H04L 63/0428* (2013.01); *H04L 63/061* (2013.01); *H04L 63/08* (2013.01); *H04L 63/123* (2013.01); *H04L 63/162* (2013.01); *H04W 12/06* (2013.01); *H04W 12/122* (2021.01); *H04L 2101/622* (2022.05)

(58) Field of Classification Search
CPC . H04L 61/103; H04L 63/0428; H04L 63/061; H04L 63/08; H04L 63/123; H04L 63/162; H04L 2101/622; H04L 63/0407; H04W 12/06; H04W 12/122; H04W 12/062
See application file for complete search history.

(56) References Cited

U.S. PATENT DOCUMENTS

| | | |
|---|---|---|
| 9,426,139 B1 | 8/2016 | McClintock et al. |
| 10,555,172 B2 | 2/2020 | Werdell et al. |

(Continued)

FOREIGN PATENT DOCUMENTS

| | | |
|---|---|---|
| CN | 104540189 A | 4/2015 |
| CN | 110891270 B | 8/2021 |

(Continued)

OTHER PUBLICATIONS

International Search Report in PCT/US2020/044105; Sep. 9, 2020.

*Primary Examiner* — Vinncelas Louis
(74) *Attorney, Agent, or Firm* — Josh C. Snider; Snider IP

(57) ABSTRACT

A network server is provided. The network server includes at least one processor in communication with at least one memory device. The network server is programmed to receive an access request originating from a user device, perform an authentication process for connecting with the user device, transmit, to the user device, a request message for a media access control (MAC) address of the user device, receive, from the user device, a response message including the MAC address of the user device, and determine whether to grant the access request based on the MAC address of the user device.

15 Claims, 9 Drawing Sheets

(56) References Cited

U.S. PATENT DOCUMENTS

| | | | |
|---|---|---|---|
| 2003/0177267 A1* | 9/2003 | Orava | H04L 63/0407 |
| | | | 709/245 |
| 2004/0107360 A1 | 6/2004 | Herrmann et al. | |
| 2008/0081592 A1* | 4/2008 | Das | H04W 12/062 |
| | | | 455/406 |
| 2013/0103527 A1 | 4/2013 | Cho et al. | |
| 2013/0298209 A1 | 11/2013 | Targali et al. | |
| 2015/0281245 A1 | 10/2015 | Liu et al. | |
| 2018/0248871 A1 | 8/2018 | Tsirkin | |
| 2019/0132308 A1 | 5/2019 | Graham et al. | |

FOREIGN PATENT DOCUMENTS

| | | | |
|---|---|---|---|
| JP | 2007018081 A | * | 1/2007 |
| JP | 2013214825 A | | 10/2013 |

\* cited by examiner

| CODE 505 | IDENTIFIER 510 | LENGTH 515 | TYPE 520 | TYPEDATA 525 | DATA 530 |

SYSTEMS AND METHODS FOR OBTAINING PERMANENT MAC ADDRESSES

RELATED APPLICATIONS

This application is a divisional of U.S. patent application Ser. No. 16/941,328, filed Jul. 28, 2020, which application claims the benefit of and priority to U.S. Provisional Patent Application Ser. No. 62/879,953, filed Jul. 29, 2019, the disclosure of which is herein incorporated by reference in its entirety.

FIELD

This disclosure relates in general to the field of communications and, more particularly, techniques for managing scenarios where stable MAC addresses are required.

BACKGROUND

Many devices are beginning to randomize the media access control (MAC) address presented to WI-FI access points (AP) over the air upon each association. However, Stable Wi-Fi MAC addresses are essential for a number Wi-Fi features and for operational requirements during inter-operator Wi-Fi roaming scenarios. Some wireless devices are starting to randomize their MAC addresses presented over the air for the sake of user privacy and to prevent device tracking by unauthorized entities. However, this hinders certain features and operational procedures. There is a need for a method and procedures to protect privacy, prevent authorized tracking, while still supporting Wi-Fi features and inter-operator Wi-Fi roaming.

SUMMARY OF THE INVENTION

In an embodiment, a network server is provided. The network server includes at least one processor in communication with at least one memory device. The network server is programmed to receive an access request originating from a user device. The network server is also programmed to perform an authentication process for connecting with the user device. The network server is further programmed to transmit, to the user device, a request message for a media access control (MAC) address of the user device. In addition, the network server is programmed to receive, from the user device, a response message including the MAC address of the user device. Moreover, the network server is programmed to determine whether to grant the access request based on the MAC address of the user device.

In another embodiment, a network server is provided. The network server includes at least processor in communication with at least one memory device. The network server is programmed to receive an access request originating from a user device. The network server is also programmed to establish a ciphered tunnel between the network server and the user device. The network server is further programmed to transmit, to the user device, a request message for a media access control (MAC) address of the user device. In addition, the network server is programmed to receive, from the user device, a response message including the MAC address of the user device. Moreover, the network server is programmed to determine whether to continue an authentication process based on the MAC address of the user device.

In a further embodiment, an access point is provided. The access point includes at least processor in communication with at least one memory device. The access point is programmed to receive a first association request message originating from a user device including a first MAC address. The first MAC address is a randomized MAC address. The access point is also programmed to transmit the first MAC address to a network server for authentication. The access point is further programmed to receive an authentication failed message from the network server. In addition, the access point is programmed to transmit an association response message to the user device. The association response message includes a request for a real MAC address. Moreover, the access point is programmed to receive a second association request message including a second MAC address from the user device. Furthermore, the access point is programmed to transmit the first MAC address to the network server for authentication. In addition, the access point is also programmed to receive an authentication success message from the network server. In addition, the access point is programmed to continue an association process based on the authentication success message.

In yet another embodiment, an access point is provided. The access point includes at least one processor in communication with at least one memory device. The access point is programmed to transmit messages over a wireless network indicating an available network. The access point is also programmed to receive an access network query protocol (ANQP) query from a user device. The access point is further programmed to transmit an ANQP response including requirements to connect to the available network. The requirements include that a real MAC address is required for access to the available network.

In still a further embodiment, a network server is provided. The network server includes at least one processor in communication with at least one memory device. The network server is programmed to receive an access request originating from a user device, including authentication information. The authentication information includes a randomized MAC address for the user device. The network server is also programmed to compare the authentication information to a database of registered devices to determine if the authentication information is in the database. The network server is further programmed to determine an account based on the comparison. In addition, the network server is programmed to associate the randomized MAC address with the account.

In yet another embodiment, an access point includes at least one processor in communication with at least one memory device. The access point is programmed to transmit an identity request message to a user device. The access point is also programmed to receive an identity response message from the user device. The identity response message includes authentication credentials and a randomized MAC address. The access point is further programmed to transmit an access request message to a network server for authentication. The access request message is based on the identity response message. In addition, the access point is programmed to receive an access accept message from the network server. The access accept message includes a unique identifier. Moreover, the access point is programmed to associate the unique identifier with the randomized MAC address.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1A:
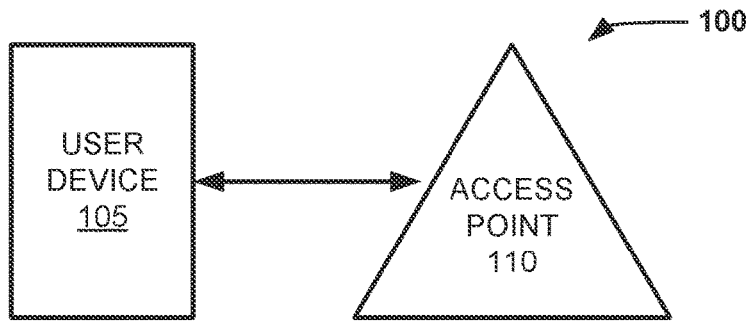
FIGS. 1A-1C are schematic illustrations of different network configurations that use permanent identifiers, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, many network connected devices have a permanent media access control (MAC) address that was assigned to a device upon creation. The MAC address is a unique identifier assigned to the network interface controller of the connected device. The MAC address is designed to be used as a network address in communications with a network. MAC addresses are primarily assigned by device manufacturers. The MAC address can also be referred to as the hardware address or the physical address of the connected device. The MAC address is stored in either the device's read-only memory or in its firmware. Network devices with multiple network interfaces, such as routers and multilayer switches, must include a unique MAC address for each network control interface. The MAC address can be a universally administered address (UAA) or a locally administered address (LAA). A UAA is assigned by the device manufacturer. A LAA is assigned to the device, by a network administrator and overrides the hardware address for the physical device. As used herein the term real MAC address refers either to a UAA, which is assigned via the hardware, or to an LAA MAC address, which is assigned by a network.

A user device uses its real MAC address to communicate with an access point can be tracked by that access point. The real MAC address can also allow malicious actors to monitor the location of the user device without the user's consent. As a counter measure to this privacy threat, operating system developers are anonymizing MAC address, which raises technical concerns among network operators. The privacy concerns include companies tracking and logging of nearby devices, whether or not, the devices are associated with the company's network, where that information is then used without the user's consent.

To address these privacy concerns, many operating systems began to implement variations of MAC address randomization when the device is probing for a network to connect to, including the use of a random MAC address for a configurable duration, such as, but not limited to, per connection, per session, and/or per reboot. The MAC address randomization provides a level of anonymity until the user device is associated with the access point. In addition, the operating systems have also implemented MAC address randomization for devices associated with a network. In some of these operating systems, the MAC address is kept consistent based on the service set identifier (SSID).

However, the MAC address randomization can cause problems with Wi-Fi networks and other related services. MAC address randomization can impact network components at the Layer two (L2) network layer. One user device can be reported several times, which causes the networking equipment to fill up its memory with outdated MAC address associations. Changing the MAC address can also negatively impact the effectiveness of some wireless features. For example, both band steering and client steering, which optimize user device connectivity in a multiple access point environment depend on unique MAC addresses for each user device for both probes and associations.

While the MAC address was not designed to be used outside of network L2, its uniqueness has caused it to be widely used for a variety of purposes, such as, but not limited to, security, access control, and billing. Some examples of these uses include: compliance with the regulatory requirement on lawful interception; network side access control based on MAC addresses; and MAC address based pair-wise shared keys.

For MAC-based identification, such as MAC authentication, MAC whitelisting, and captive portal, the MAC address is cached the first time it is used by a user device and the reused on subsequent logins by the same user device. Without this system, the customer has to re-sign in and register the device each time the device forgets the SSID, such as on reboot. This can result in a long list of devices per customer as a new entry is added every time the user device registers. Accordingly, access points and service providers tracking device history will get bloated records which contain additional entries for devices where the user device has forgotten the SSID and then reconnected.

Pay per use (PPU) customers, such as for Wi-Fi access, can have their pass associated with a MAC address. If there are changes to the MAC address, then there is no way to transfer that pass to another MAC address. This would apply to captive portal accounts as well. Furthermore, after changing their MAC address, customers can use the same user device to get another free session if available, by having their user device forget the SSID of the system.

Analytics often rely on the ability to uniquely identify a user device, which requires the same MAC address to be used consistently for each user device. Examples include help desks and login failure monitoring.

In addition, there are issues with service providers that provide roaming Wi-Fi access between multiple different access points. The service provider connection managers create profiles on the fly, but which can have the same behavior as a device that has forgotten the SSID. For connectivity, which is tied to a service provider identity, not the SSID, even maintaining the MAC address for a given SSID can be problematic as multiple SSIDs will be used for a single service provider. It would be better if the MAC address randomization maintained the same MAC address for all connections to a specific service provider entity, rather than for connections to a specific SSID.

For band steering, where there are different bands with different SSIDs (2.4 GHz and 5 GHz), devices may be reported twice on the network. Client steering is also affected if the probe requests use with a different randomized MAC address than used for the association, or if there is a different randomized MAC address per probe.

MAC address randomization can also impair the ability to enforce policies tied to specific devices, such as parental controls. The user device can forget the network, get a new MAC address, and then the network-based parental controls would no longer be properly applied. Blacklisting of devices can be gotten around by just rebooting and changing the MAC address of a blacklisted device.

The systems and methods described below provide multiple different techniques for providing the consistency of a permanent media access control (MAC) address for a roaming user device to support Wi-Fi features and inter-operator Wi-Fi roaming, while still protecting privacy, preventing authorized tracking, and supporting Wi-Fi features and inter-operator Wi-Fi roaming.

Figure 1B:
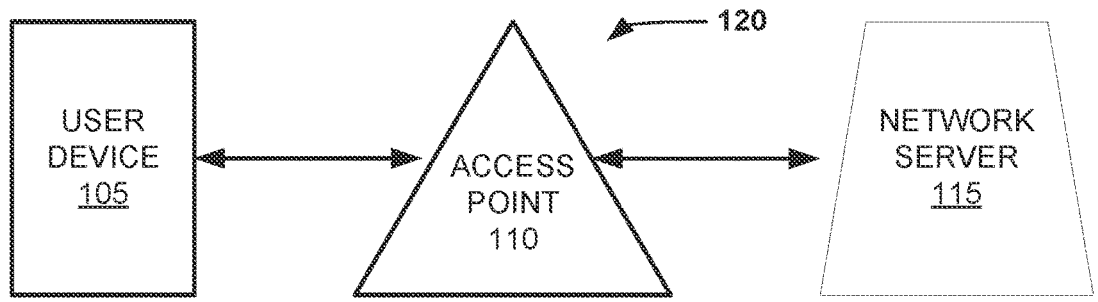
Figure 1C:
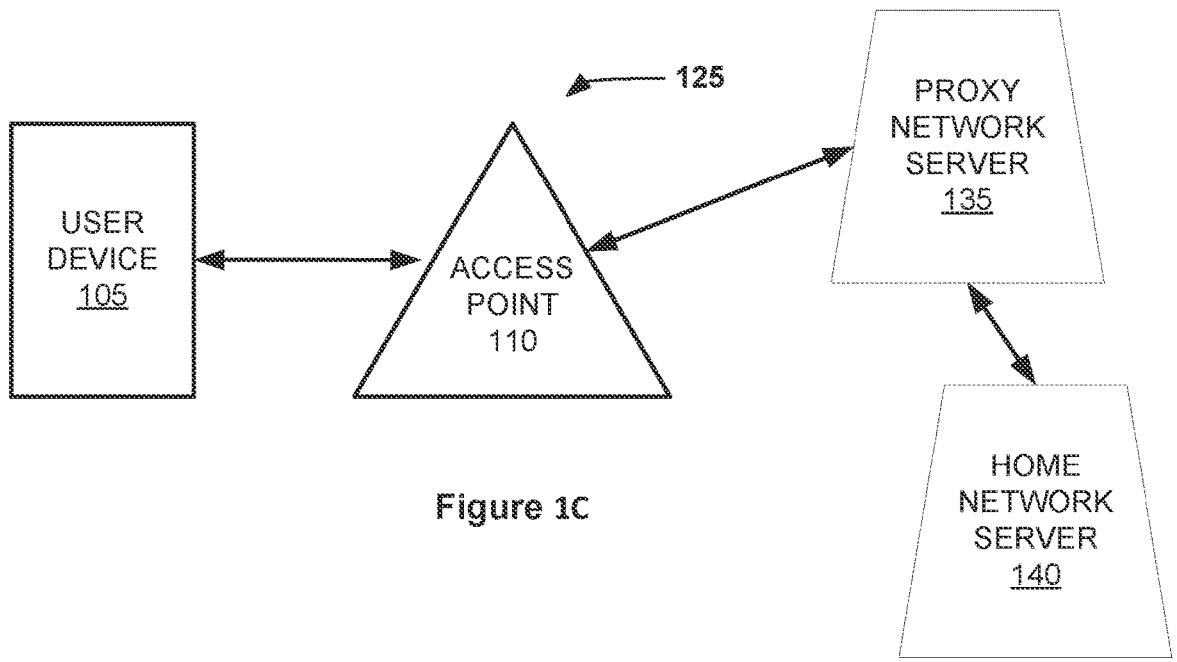

FIGS. 1A-1C are schematic illustrations of different network configurations 100, 120, and 125 that use permanent identifiers, according to an embodiment. FIG. 1A illustrates a public/private network 100, such as a Wi-Fi network operated by a small business. The network 100 allows customers to access the business' Wi-Fi, for example to access the Internet. The network 100 can be a public network, a private network, or have both public and private access, such as in the case of a doctor's office, where there is a private network for employees and a public network for patients. The network 100 generally includes one or more user devices 105 attempting to gain access to the network through the access point 110. The user device 105 can include, but is not limited to, a laptop computer, a personal digital assistant (PDA), a cellular phone, a smartphone, a tablet, a phablet, wearable electronics, smart watch, an IP camera, Internet of Things devices (such as smart lightbulbs, etc.), and/or other web-based connectable equipment or mobile devices. The access point 110 is a gateway that determines whether or not to provide access to a user device 105 and also routes information to and from the user device 105.

FIG. 1B illustrates a private network 120 operated by an enterprise. In private network 120, the user device 105 attempts to access the private network 120. The access point 110 receives the credentials of the user device 105 and routes the credentials to a network server 115. The network server 115 can be an AAA server, which is a server program that handles user requests for access to computer resources and provides authentication, authorization, and accounting (AAA) services. Authentication is the process of identifying an individual, usually based on a username and password. Authentication is based on the idea that each individual user will have unique information that sets him or her apart from other users. Authorization is the process of granting or denying a user access to network resources once the user has been authenticated through the username and password. The amount of information and the amount of services the user has access to depend on the user's authorization level. Accounting is the process of keeping track of a user's activity while accessing the network resources, including the amount of time spent in the network, the services accessed while there and the amount of data transferred during the session. Accounting data is used for trend analysis, capacity planning, billing, auditing and cost allocation.

The abovementioned unique information can include the MAC address for the user device 105. When the MAC address is randomized, the access point 110 and the Network server 115 have to associate the user device 105 with the random MAC address that was provided. When the user device 105 logs off of the network and then comes back, the network 120 has to reassociate the user device 105 with a new MAC address. This can cause bloating in the association records of the Network server 115 and lowers the security of the network 120 as the network 120 does not know if the user device 105 is the same as the one that provided the authentication or login credentials before.

FIG. 1C illustrates a roaming network 125. In the roaming network 125, the user device 105 is capable of accessing a public Wi-Fi operated by a large operator. For example, a service provider provides Wi-Fi access to subscribers at airports. A user can sign up with the operator to access the Wi-Fi at any participating airport. When the user attempts to connect to the Wi-Fi at the Dallas airport or the St. Louis airport, the user device 105 requests access from the access point 110 by providing the user's credentials. The access point 110 connects to the proxy network server 135 associated with the airport. The proxy network server 135 transmits the user's credentials to the home network server 140 to authenticate and authorize the user device 105. In some embodiments, the user's credentials include the user device's MAC address.

Figure 2:
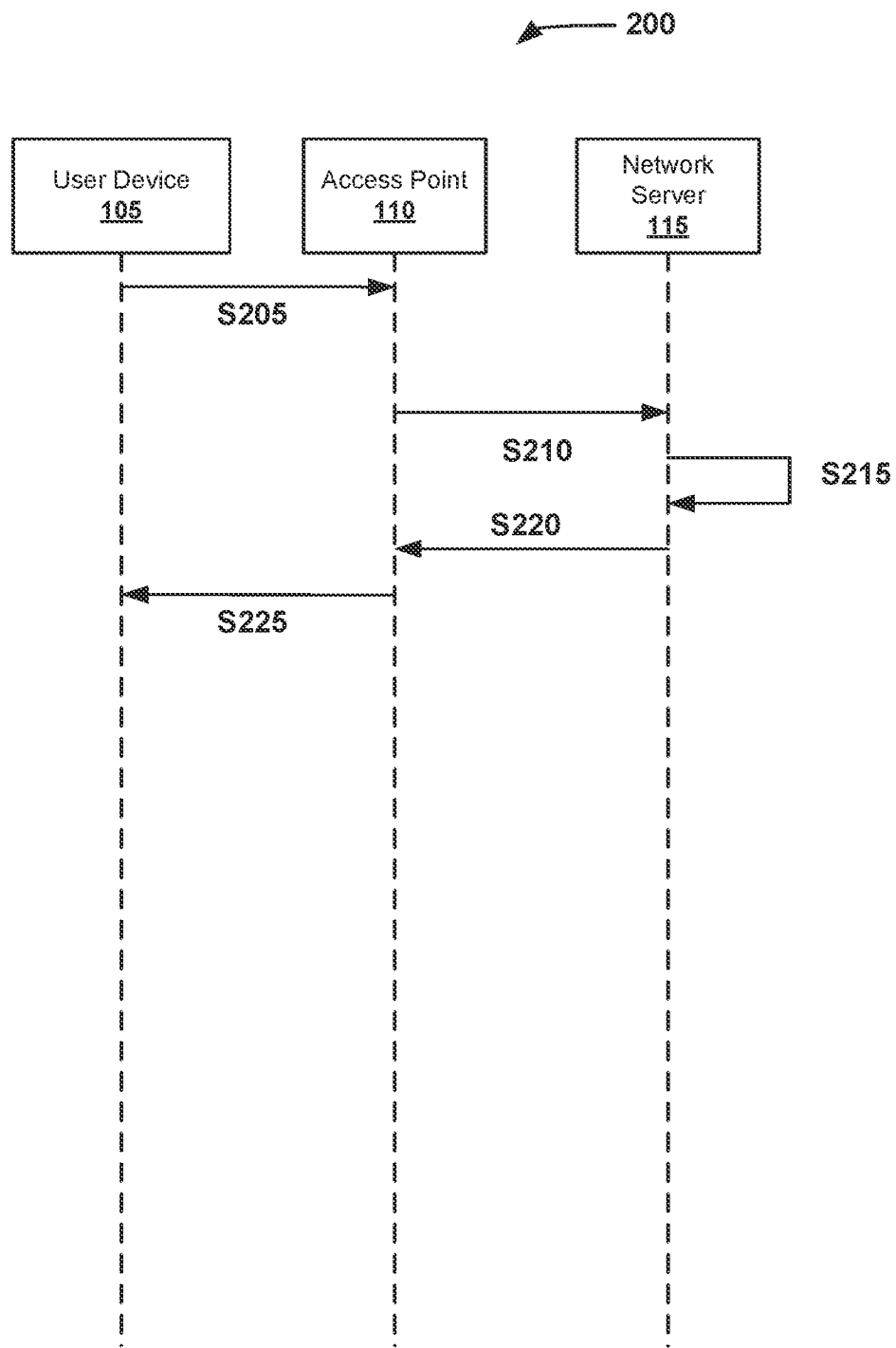
FIG. 2 is a data flow diagram of a process for authenticating a user device for accessing a network by using the network configurations shown in FIG. 1.

FIG. 2 is a data flow diagram of a process 200 for authenticating a user device for accessing a network by using the network configurations 100, 120, and 125 (shown in FIG. 1). In Step S205, the user device 105 requests access to a network from the access point 110. The request for access includes one or more credentials from the user device 105, such as, but not limited to, username, password, a token, and/or MAC address. In Step S210, the access point 110 transmits the request for access to the Network server 115. In Step S215, the Network server 115 authenticates and authorizes the user device 105. In Step S220, the Network server 115 transmits a response to the request to the access point 110. In Step S225, the access point 110 transmits the response to the request to the user device 105. The response can either approve the user device 105 for access or deny access to the user device 105.

The following embodiments include two types of approaches to address the problems described above, namely, those of keeping the security of having randomized MAC address while still providing the stability of the real MAC address. A first approach uses both the randomized MAC address and the real MAC address. The user device 105 would use the randomly generated MAC address during the probing, pre-association, and association phases, but then transfer its real MAC address to a trusted network operator during or after the authentication/association phases upon request. A user device 105 could determine that a network operator is trusted based on authenticating a received digital trust certificate from the network. This approach and several variations are outlined with respect to FIGS. 3-8.

A second approach uses a network assigned permanent identifier (a chargeable ID), which is generated by the home network server 140, and then shared with the remote network. This approach is described with respect to FIG. 9.

In the first approach, the network uses the random MAC address to authenticate the user device 105 while the user device 105 is authenticating the network. Once the user device 105 authenticates the network and is authenticated in return, the user device 105 provides the real MAC address. There are multiple ways to implement this approach. These implementations include, but are not limited to, defining a new Extensible Authentication Protocol (EAP) type, to reuse the EAP Identity Request and Response sequence, to reuse the 802.11 MAC layer frame, and to use the Access Network Query Protocol (ANQP). Each of these four implementations can be used on their own or in combination with each other based on the environment.

New EAP Type

Figure 3:
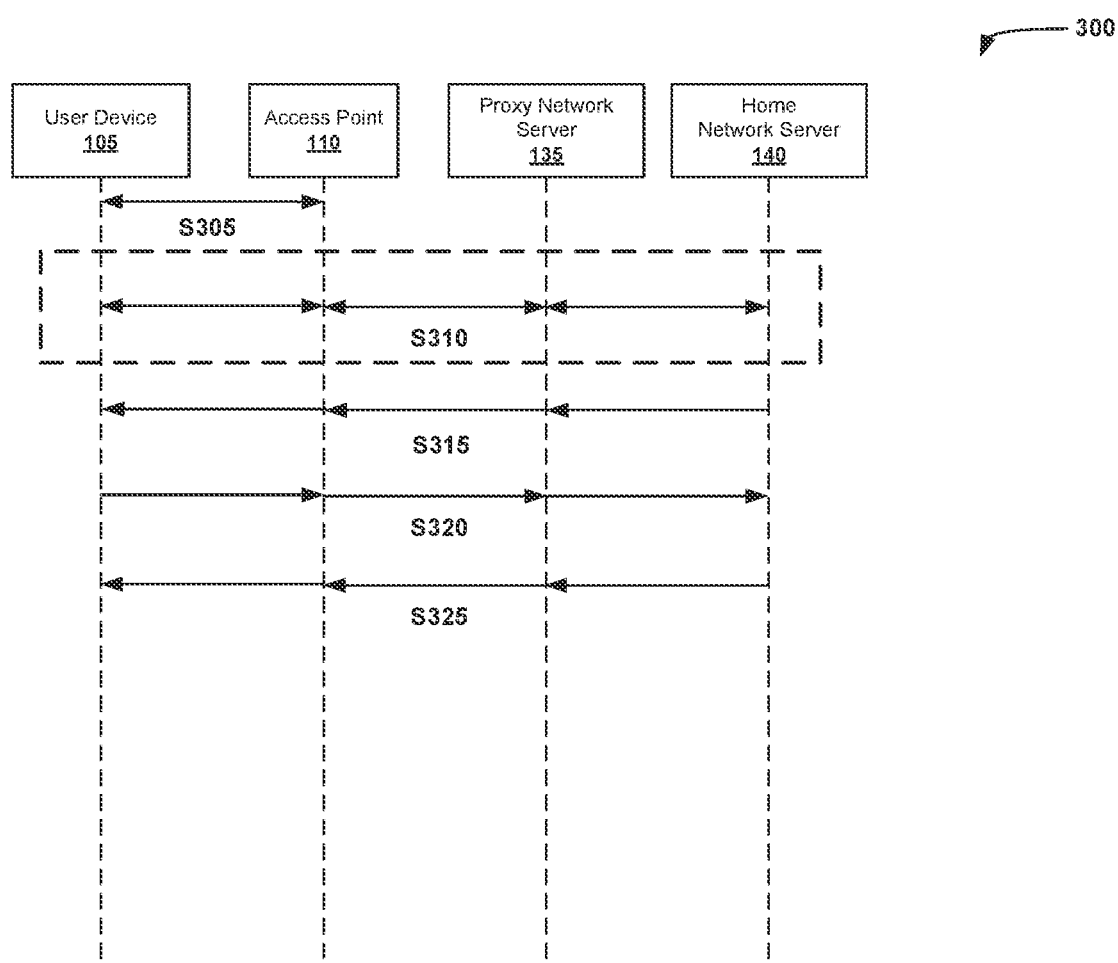
FIG. 3 is a data flow diagram of a process for authenticating a user device for accessing a network using a new Extensible Authentication Protocol (EAP) type.

In the first implementation, the network could define a new Extensible Authentication Protocol (EAP) type. FIG. 3 is a data flow diagram of a process 300 for authenticating a user device 105 for accessing a network using a new Extensible Authentication Protocol (EAP) type. This implementation is tailored for networks that support subscriber devices on secured SSIDs. The implementation further applies to inter-operator roaming scenarios. This first implementation is compatible with many 802.11 features that require a stable MAC address across associations, such as for band steering, continuous service across access points 110 and/or secure SSIDs. In this implementation, the MAC address could be made available to visited or service Wi-Fi operator networks, the home Wi-Fi operator network, serving access points, and wireless access gateways.

A variety of EAP methods can be used on secure SSIDs to both (1) authenticate the subscriber, and (2) set the over the air session key upon successful authentication, where the key is used between the user device 105 and the access point 110. In this implementation, the same key that is used to cipher the 802.11 layer could also be used to cipher the manufactured MAC address. The Network server 115 can request the ciphered manufactured MAC address from the user device 105 within a vendor specific EAP type after the access point 110 receives the master key from the home network server 140 and before the end of the EAP sequence. For IPR, different keys can be used.

The request could also be made in the MAC layer by the access point 110. This can be done by using a new attribution in an existing 802.11 frame or a new frame. The new EAP type would be configured to be independent of other EAP types and can be used in conjunction with other EAP types, including, but not limited to, EAP-TTLS, EAP-TLS, EAP-GTP, and EAP-RP.

FIG. 3 illustrates process 300 for authenticating a user device 105 for accessing a network using a new Extensible Authentication Protocol (EAP) type. In process 300, the network server 135 or 140 directly requests the user device's real MAC address. First, in Step S305 the user device 105 and the access point 110 perform the 802.11 association. In Step S310 the EAP authentication process is performed between the user device 105, access point 110, proxy network server 135, and home network server 140, where the last message includes EAP success for the original method sequence and includes the master key. Steps S305 and S310 are performed using the random MAC address. Then in Step S315, an EAP request of the new type is transmitted to the user device 105. The EAP request can include the expanded new type, vendor specific information, and a request for the MAC address. The EAP request can be initiated by the home network server 140 or the proxy network server 135. In step S320, the user device 105 responds with an EAP response including the expanded new type, vendor specific information and the MAC address response. The MAC address may be ciphered for confidentiality and/or integrity protection in the response and to prevent the MAC address from being read over the air. The cryptographic keying materials used by the user device 105 for protecting the MAC address can be preconfigured or transferred by the network (e.g., in the EAP request in Step S315). If the deciphering or integrity check fails or the user device 105 fails to provide a MAC address, the initiating network server 135 and 140 terminates services with an EAP failure. Service is then terminated for the user device 105 with the service network. If the deciphering and integrity check succeeds, the network server 135 or 140 transmits an EAP success message as shown in Step S325. In some embodiments, the access point 110 and the proxy network server 135 can also retrieve the MAC address from the EAP Response.

The user device 105 can either provide the actual hardware MAC address or a MAC address that the user device 105 has generated specifically for any time this network is accessed.

In some cases, the network endpoint is placed on a wireless access gateway controller (WAG). In these cases, the manufacturer or network operator would select or configure the protocol used to transfer EAP between the access point 110 and the WAG. The manufacturer or operator would also determine the protocol to transfer the key received from the network server 135 or 140 to the access point 110. While this would add a network element and additional signally to FIG. 3, the concept and primary features would remain the same.

In at least one embodiment, a network server 135 or 140 receives an access request S310 originating from a user device 105. The network server 135 or 140 performs an authentication process S310 for connecting with the user device 105. The network server 135 or 140 transmits, to the user device 105, a request message S315 for a media access control (MAC) address of the user device 105. The network server 135 or 140 receives, from the user device 105, a response message S320 including the MAC address of the user device 105. The network server 135 or 140 determines whether to grant the access request based on the MAC address of the user device 105.

The network server 135 or 140 performs at least one of an integrity check or a confidentiality check of the MAC address. The network server 135 or 140 determines whether to grant the access request based on results of at least one of the integrity check and the confidentiality check. The network server 135 or 140 receives an encrypted MAC address of the user device 105 in the response message S320. The network server 135 or 140 determines whether to grant the access request based on decryption of the encrypted MAC address of the user device 105. The network server 135 or 140 transmits a cryptographic key in the request message for the MAC address of the user device 105. The network server 135 or 140 decrypt the encrypted MAC address of the user device 105 using a cryptographic key used to cipher an 802.11 layer. The network server 135 or 140 transmits an access request success message if the determination is to grant the access request. The network server 135 or 140 transmits an access request failure message S325 if the determination is to deny the access request. The network server 135 or 140 terminates service for the user device 105 if the determination is to deny the access request.

The access request can include a randomized MAC address from the user device. The access request can be received from an access point 110 in communication with the user device. The access request is received from a proxy server 135.

In some embodiments, the authentication process is an Extensible Authentication Protocol (EAP) authentication process. In these embodiments, the request message for the MAC address of the user device includes an EAP type to specifically request the MAC address of the user device. The EAP type expands a listing of EAP types. The EAP type can be used in conjunction with EAP-TTLS, EAP-TLS, EAP-GTP, and EAP-RP. The user device 105 can be one of a mobile device, a smart phone, a laptop, and a tablet. The access request can be a request for access to a Wi-Fi network, a request for Internet access, or a request for cellular access. The MAC address of the user device can be one of a hardware address, a manufacturer provided address, universally administered address, and a locally administered address.

In some embodiments, the network server 135 or 140 is in communication with at least one of a proxy server 135 and an access point 110. The proxy server 135 or the access point 110 is programmed to retrieve the MAC address of the user device 105 from the response message.

Figure 4:
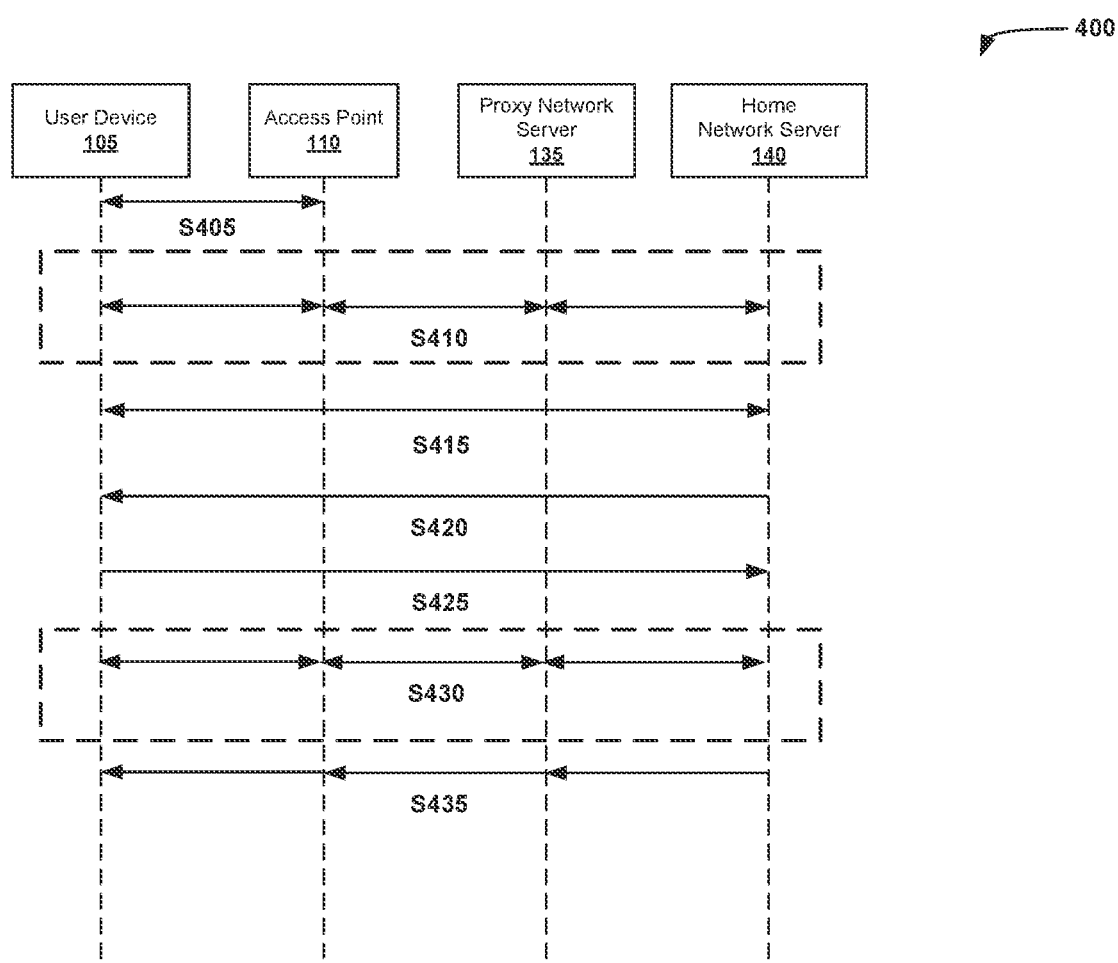
FIG. 4 is a data flow diagram of another process for authenticating a user device for accessing a network using the new Extensible Authentication Protocol (EAP) type.

FIG. 4 is a data flow diagram of another process 400 for authenticating a user device for accessing a network using the new Extensible Authentication Protocol (EAP) type. Process 400 illustrates a tunneled case, where a tunnel is created between the network server 135 or 140 and the user device 105 to allow for the secure transfer of the real MAC address during or after the EAP authentication process. In Step S405, the user device 105 and the access point 110 perform the 802.11 association. In Step S410, the EAP authentication process is used that leverages the transport layer security (TLS) protocol, such as, but not limited to, EAP-TTLS, EAP-TLS, and PEAP. In Step S415, a ciphered tunnel is established between the network server 135 or 140 and the user device 105. This would be mid-sequence for EAP-TLS and EAP-TTLS. Steps S405, S410, and S415 are performed using the random MAC address. In Step S420, the network server 135 or 140 transmits the EAP request directly to the user device 105. The EAP request can include the expanded new type, vendor specific information, and a request for the MAC address. In Step S425, the user device 105 transmits the EAP response directly to the requesting network server 135 or 140. The EAP response includes the expanded new type, vendor specific information and the MAC address response. The MAC address is ciphered for confidentiality and/or integrity protection in the response. If the deciphering or integrity check fails or the user device 105 fails to provide a MAC address, the initiating network server 135 and 140 terminates services with an EAP failure. Service is then terminated for the user device 105 with the service network. If the integrity check succeeds, the EAP authentication process continues, as shown in Step S430. Upon completion of the EAP authentication process, the network server 135 or 140 transmits an EAP success message as shown in Step S435. As shown in Step S435, the proxy network server 135 and the access point 110 can both retrieve the MAC address from the EAP success message. The MAC address is removed from the EAP success message before the message is sent to the user device 105. In other embodiments, the MAC address can be distributed via the Remote Authentication Dial-In User Service (RADIUS) protocol or the DIAMETER attribute-value pairs (AVP).

In some embodiments, the EAP-MAC can be bound to the EAP-Success and thus will be transmitted prior to the EAP-Success. In other embodiments, the EAP-MAC type is independent of EAP authentication and could be sent to the user device 105 at any time after the initial authentication. It would be up to the network operator to determine if the user device 105 could remain connected to the network if no EP-MAC response is received from the user device 105. In some embodiments, the network can disable the connection with the user device 105 if no EP-MAC response is received. In other embodiments, the network allows the user device 105 to remain connected. In some of these embodiments, the network allows the user device 105 to remain connected, but limits the user device's access on the network. In still other embodiments, the user device is shunted to a public or low security network, such as a guest network. In some embodiments, the EAP-RP can also be extended to include the real MAC cached for this session and then to be sent to a second access point 110.

In both processes 300 and 400, when the user device 105 determines that the access point 110 requires a real MAC address to proceed, the user device 105 can either (1) continue along the process by sending the real MAC address that is registered with the operator network, or (2) abandon the attempt to gain access to the network.

While FIGS. 3 and 4 illustrate both of the proxy network server 135 and the home network server 140, both servers 135 and 140 could be replaced, in some embodiments, with a single Network server 115 (shown in FIG. 1B).

Referring back to FIG. 4, the network server 135 or 140 receives an access request S410 originating from a user device 105. The network server 135 or 140 establishes a ciphered tunnel S415 between the network server 135 or 140 and the user device 105. The network server 135 or 140 transmits, to the user device 105, a request message S420 for a media access control (MAC) address of the user device 105. The network server 135 or 140 receives, from the user device 105, a response message S425 including the MAC address of the user device 105. The network server 135 or 140 determines whether to continue an authentication process based on the MAC address of the user device 105.

The network server 135 or 140 begins the authentication process prior to establishing the ciphered tunnel S415. The network server 135 or 140 performs at least one of an integrity check or a confidentiality check of the MAC address. The network server 135 or 140 determines whether to grant the access request based on results of at least one of the integrity check and the confidentiality check. The network server 135 or 140 receives an encrypted MAC address of the user device 105 in the response message. The network server 135 or 140 determines whether to grant the access request based on decryption of the encrypted MAC address of the user device 105. The network server 135 or 140 transmits a cryptographic key in the request message for the MAC address of the user device 105.

The network server 135 or 140 decrypts the encrypted MAC address of the user device using a cryptographic key used to cipher an 802.11 layer. The network server 135 or 140 continue the authentication process if the determination is to grant the access request. The network server 135 or 140 transmits, to the user device 105, an access request success message at the end of the authentication process. The network server 135 or 140 is in communication with at least one of a proxy server 135 and an access point 110. The proxy server 135 or access point 110 is programmed to retrieve the MAC address of the user device 105 from the access request success message. The network server transmits an access request failure message if the determination is to deny the access request. The network server 135 or 140 terminates service for the user device 105 if the determination is to deny the access request. The access request can include a randomized MAC address from the user device 105. The access request can be received from one of an access point in communication with the user device and a proxy server.

In some embodiments, the authentication process can be an Extensible Authentication Protocol (EAP) authentication process. The request message for the MAC address of the user device 105 includes an EAP type to specifically request the MAC address of the user device 105. The EAP type expands a listing of EAP types. The EAP type may be used in conjunction with EAP-TTLS, EAP-TLS, EAP-GTP, and EAP-RP. The user device 105 can be one of a mobile device, a smart phone, a laptop, and a tablet. The access request is one of a request for access to a Wi-Fi network, a request for Internet access, and a request for cellular access. The MAC address of the user device 105 is one of a hardware address, a manufacturer provided address, universally administered address, and a locally administered address.

EAP Identity Request and Response

In this implementation, the EAP Identity Request and Response messages are extended to include the MAC address. The EAP Identity TypeData is a string terminated with a NULL. Some implementations piggyback data after the NULL. The implementation defines the Identity TypeData as Type-Length-Value (TLV). Using this format, the EAP Identity message can be used to request the real MAC address and other identities as needed. The Identity Request for the real MAC address can be transmitted by the network after the secure tunnel has been established, such as after EAP-TLS. Or the Identity Request for the real MAC address can be transmitted by the network in response to an access request.

Figure 5:
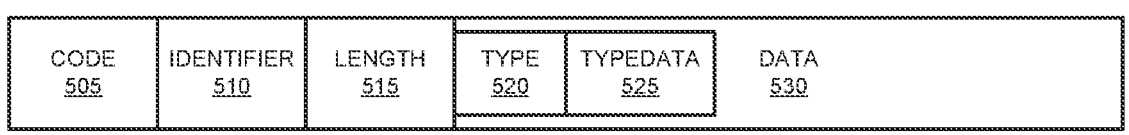
FIG. 5 illustrates a layout for a packet such as for EAP Request and Response messages.

FIG. 5 illustrates a layout for a packet 500 such as for EAP Request and Response messages. The packet 500 includes a code field 505, an identifier field 510, and a length field 515. The packet 500 also includes a type field 520 and a TypeData field 525. In the EAP packet format the type field 520 and the TypeData field 525 are both included in the data field 530 of the packet. The contents of the code field 505 for the EAP message is one byte long can include the following values: 1—Request, 2—Response, 3—Success, and 4—Failure. The identifier field 510 is used to match the EAP request with the EAP response and is one byte long. The length field 515 indicates the length of the packet and is 2 bytes long.

The type field 520 would be set to identity, e.g., 1. The TypeData field 525 would be set to TLV, for example. Then after the TypeData field 525, the data field 530 would contain at least one of the user identifier and the machine identifier. In the response, the data field 530 would also include one or more of the current MAC address of the user device 105, the real MAC address of the user device 105, an IP address, and a fully qualified domain name (FDQN).

Figure 6:
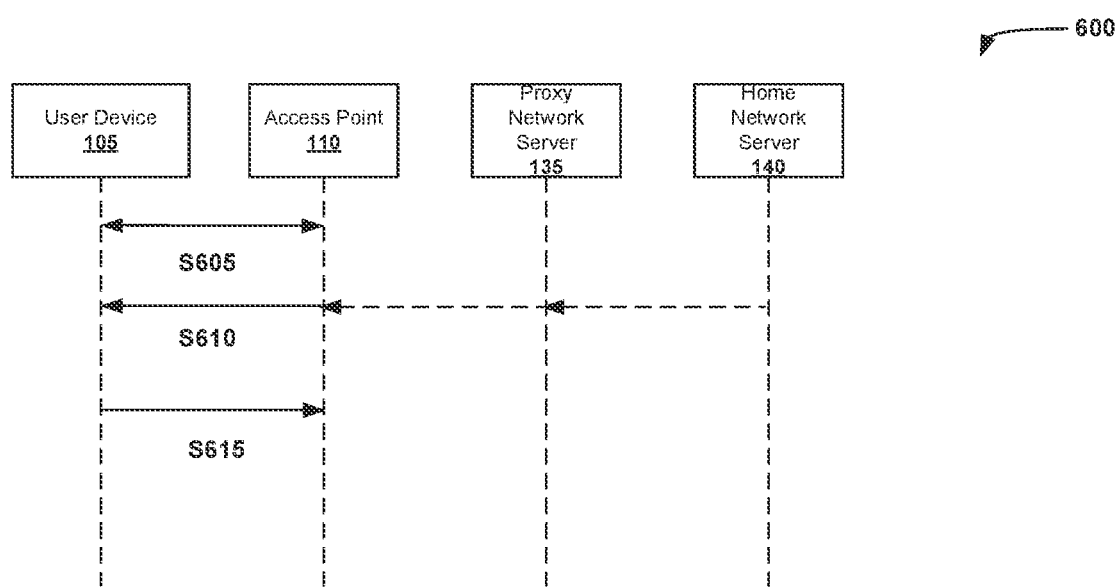
FIG. 6 is a data flow diagram of a process for authenticating a user device for accessing a network using the EAP request and response packet shown in FIG. 5.

FIG. 6 is a data flow diagram of a process 600 for authenticating a user device for accessing a network using the EAP request and response packet 500 (shown in FIG. 5). Process 600 illustrates the case, where the Identity Request and Response messages are formatted as the packet 500 to allow for the transfer of the real MAC address of the user device 105.

First, in Step S605 the user device 105 and the access point 110 perform the 802.11 association. In Step S610 the EAP authentication process begins with an Identity Request that includes a request for the real MAC address of the user device 105. In some embodiments, the identity request originates from the access point. In other embodiments, the identity request originates from the proxy network server 135 or the home network server 140. In Step S615, the user device 105 responds to the request with the Identity Response message formatted as shown in packet 500. In other embodiments, the EAP Identity Request message is transmitted after the tunnel is put in place between the user device 105 and the home network server 140, such as after Step S415 in FIG. 4.

In process 600, when the user device 105 receives the Identity Request and determines that the access point 110 requires a real MAC address to proceed, the user device 105 can either 1) continue along the process by sending the real MAC address that is registered with the operator network; or 2) the user device 105 can abandon the attempt to gain access to the network.

For each EAP authentication method, the network could require the inclusion of the real MAC address along with the user identity in the EAP identity request. For example, the information could be formatted as realMACaddress:userIdentity@realm or userIdentity@realm\null realMACaddress. These formats can be configured to be backward compatible.

In some embodiments, the network device receives an access request originating from a user device 105. The network device transmits, to the user device 105, a request message for a media access control (MAC) address of the user device 105. The network device receives, from the user device 105, a response message including the MAC address of the user device 105. The network device determines whether to continue an authentication process based on the MAC address of the user device 105. The network device is an access point 110 and is in direct communication with the user device 105.

The network device performs an 802.11 association process with the user device 105 prior to transmitting the request message for a media access control (MAC) address of the user device 105. The network device can be a network server 135 or 140 and is in communication with an access point 110. The network device establishes a ciphered tunnel between the network server 135 or 140 and the user device 105.

In some embodiments, the request message is an Extensible Authentication Protocol (EAP) request message. The EAP request message can be an EAP identity request message. In the EAP request message is a type field is set to identity and a typedata field is set to Type-Length-Value (TLV). The response message can be an EAP identity response message. The EAP identity response message includes the MAC address and user identity information. The authentication process can be an Extensible Authentication Protocol (EAP) authentication process. The user device 105 is one of a mobile device, a smart phone, a laptop, and a tablet. The access request is one of a request for access to a Wi-Fi network, a request for Internet access, and a request for cellular access. The MAC address of the user device 105 is one of a hardware address, a manufacturer provided address, universally administered address, and a locally administered address.

802.11 MAC Layer Frame

In this implementation, the 802.11 management frames are extended for the access point 110 to indicate to the user device 105 to transmit its real MAC address to the access point 110. All association responses from the access point 110 to the user device 105 include a new information field indicating that a real MAC address is required for access. The real MAC address is transmitted to the network server 135 or 140, which determines if the provided MAC address is a registered permanent address. The network server 135 or 140 has access to a database of registered real MAC addresses and associated user ids or account. If the real MAC address is found, then the network server 135 or 140 or the access point 110 allows the association process to continue. Otherwise, the initial association is rejected.

When the user device 105 determines that the access point 110 requires a real MAC address to proceed, the user device 105 can either 1) send a new association with the real MAC address that is registered with the operator network; or 2) the user device 105 can abandon the attempt to gain access to the network. However, one implication is that the real MAC address can be seen on the air interface in the clear.

Figure 7:
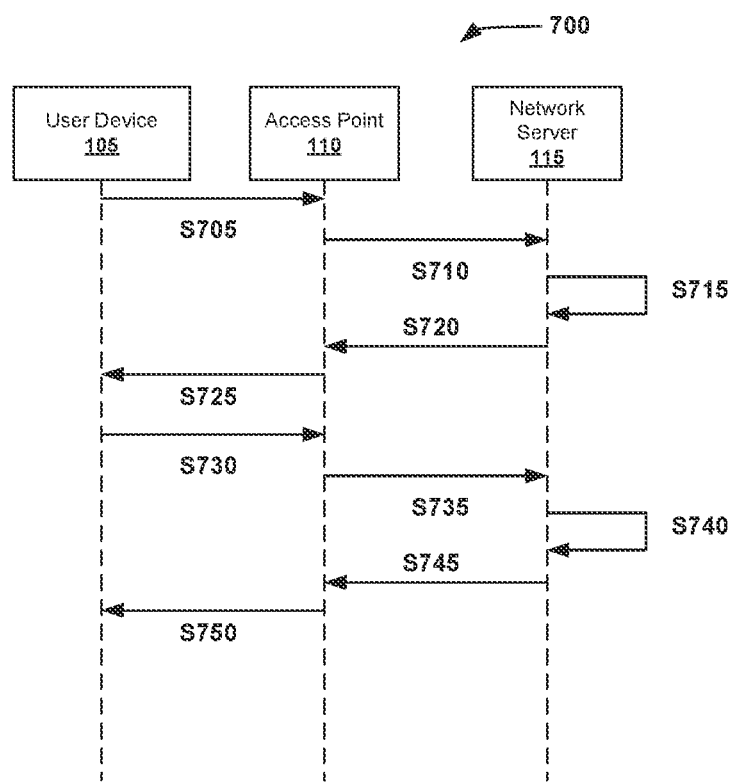
FIG. 7 is a data flow diagram of a process for authenticating a user device for accessing a network using an extended MAC frame for a real MAC address.

FIG. 7 is a data flow diagram of a process 700 for authenticating a user device for accessing a network using an extended MAC frame for a real MAC address. In Step S705, the user device 105 transmits an 802.11 association request using a random MAC address. The access point 110 receives the request. In Step S710, the access point 110 requests the Network server 115 to do a check of the MAC address. In Step S715, the Network server 115 determines that the MAC address is not registered. In some embodiments, the Network server 115 determines that the MAC address and user identifier combo is not found in a local registration database or in a remote registration database. In Step S720, the Network server 115 informs the access point 110 that the MAC address is not registered. At this point, a rejection message could be transmitted to the user device 105 from the access point 110. In Step S725, the access point 110 may transmit an 802.11 association response to the user device, where the association response includes information indicating that a real MAC address is required. In Step S730, the user device 105 transmits the 802.11 association request with the real MAC address. In Step S735, the access point 110 requests another MAC address check from the Network server 115. In Step S740, the Network server 115 verifies that the real MAC address is registered. In Step S745, the Network server 115 transmits the verification of the MAC address to the access point 110. In Step S750, the access point 110 transmits an 802.11 association response-association accepted message to the user device 105.

While process 700 is shown with respect to the Network server 115, process 700 could also be performed with respect to the proxy network server 135 and/or home network server 140 (both shown in FIG. 1).

In processes 700, when the user device 105 receives the Identity Request and determines that the access point 110 requires a real MAC address to proceed, the user device 105 can either (1) continue along the process by sending the real MAC address that is registered with the operator network, or (2) abandon the attempt to gain access to the network.

In some embodiments, the access point 110 receives S705 a first association request message originating from a user device 105 including a first MAC address. The first MAC address is a randomized MAC address. The access point 110 transmits (e.g., step S710) the first MAC address to a network server 115 for authentication. The access point 110 receives (e.g., step S720) an authentication failed message from the network server 115. The access point 110 transmits (e.g., step S725) an association response message to the user device 105. The association response message includes a request for a real MAC address. The access point 110 receives (e.g., step S730) a second association request message including a second MAC address from the user device 105. The access point 110 transmits (e.g., step S735) the first MAC address to the network server 115 for authentication. The access point 110 receives (e.g., step S745) an authentication success message from the network server 115. The access point 110 continues an association process based on the authentication success message. The access point 110 transmits (e.g., step S750) an association accepted response to the user device 105. The association process can be an 802.11 association process.

The network server 115 receives (e.g., step S710) a MAC address for authentication from the access point 110. The network server 115 compares (e.g., step S715) the received MAC address to a database of registered devices to determine if the received MAC address is in the database. The network server 115 transmits (e.g., step S720) results of the comparison to the access point 110. The network server 115 receives a MAC address and user identity for authentication from the access point 110. The network server 115 compares (e.g., step S715) the received MAC address and user identity to a database of registered devices to determine if the received MAC address and user identity combination is in the database. The network server 115 transmits (e.g., steps S720 or S745) results of the comparison to the access point 110. The user device 105 can be one of a mobile device, a smart phone, a laptop, and a tablet.

The first association request message can be a request for access to a Wi-Fi network, a request for Internet access, and a request for cellular access. The MAC address of the user device 105 can be one of a hardware address, a manufacturer provided address, universally administered address, and a locally administered address.

Access Network Query Protocol (ANQP)

In this implementation, the Access Network Query Protocol (ANQP) is used to advertise that the network requires real MAC addresses to connect. The ANQP is typically used by the user device 105 to discover the capabilities of the associated access point 110 or network. In this implementation, the ANQP is extended to indicate the network admission standards to the user device 105. ANQP is often used with secure SSID, which mandate EAP. Here the 802.11 ANQP query response from the access point 110 to the user device 105 is extended to indicate that the use of a real MAC address is mandatory. The user device 105 will then need to include its real MAC address in the EAP method it selects to authenticate the network.

Figure 8:
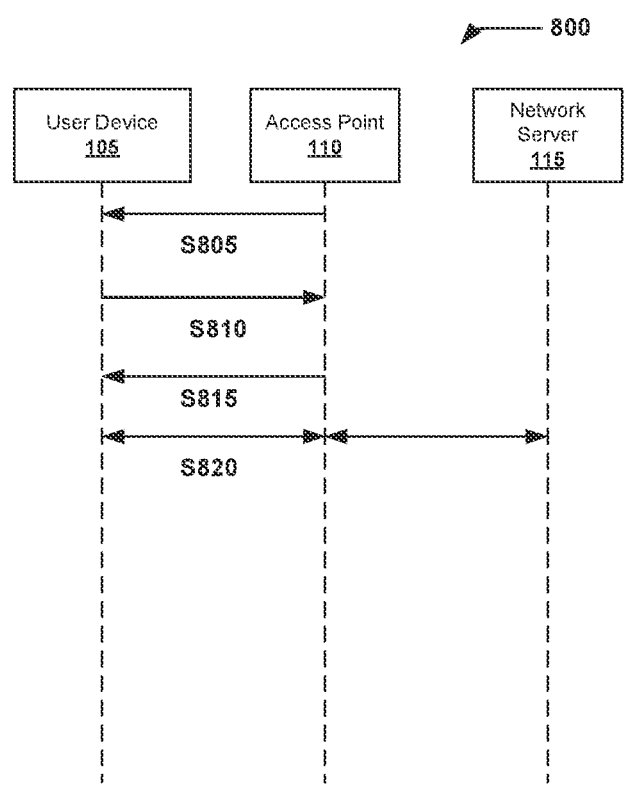
FIG. 8 is a data flow diagram of a process for advertising the requirements for connecting to a network.

FIG. 8 is a data flow diagram of a process 800 for advertising the requirements for connecting to a network. In Step S805, the access point 110 transmits network advertisements to show that it has an available network. In Step S810, the user device 105 transmits an ANQP query based on the advertisement to the access point 110. In Step S815, the access point 110 responds with an ANQP response that indicates the requirements for connecting to the network that include that a real MAC address is required for access to the network. In Step S820, the user device 105 attempts to connect to the network using the required method. In some embodiments, the user device 105 attempts to connect to the network using EAP, such as shown in FIGS. 3-6. In other embodiments, the user device 105 attempts to connect to the network using the 802.11 MAC frames as shown in FIG. 7. Process 800 is compatible with the processes shown above with respect to FIGS. 3-6.

The access point 110 transmits (e.g., step S805) messages over a wireless network indicating an available network. The access point 110 receives an access network query protocol (ANQP) query from a user device 105. The access point 110 transmits (e.g., step S815) an ANQP response including requirements to connect to the available network. The requirements can include that a real MAC address is required for access to the available network.

The access point 110 receives an access request to connect to the available network including the requirements to connect to the available network. The access point 110 starts an authentication process in response to the access request. The requirements include an authentication method for connecting to the available network. The authentication method can be Extensible Authentication Protocol (EAP) authentication. The authentication method can include 802.11 MAC frames. The authentication method is a request for access to a Wi-Fi network, a request for Internet access, and a request for cellular access. The user device 105 is one of a mobile device, a smart phone, a laptop, and a tablet. The MAC address of the user device can be one of a hardware address, a manufacturer provided address, universally administered address, and a locally administered address.

Network Assigned Permanent Identifier

Another approach uses a network assigned permanent identifier (a chargeable ID), which is generated by the home network server 140, and then shared with the remote network that the user device 105 is attempting to access. In this approach, the user device 105 registers with the home network server 140, such as for a subscription access service. The home network server 140 generates and assigns a unique identifier to the user device 105. The home network server 140 then stores that unique identifier in a registration database along with other identifying data, such as user name and password.

Figure 9:
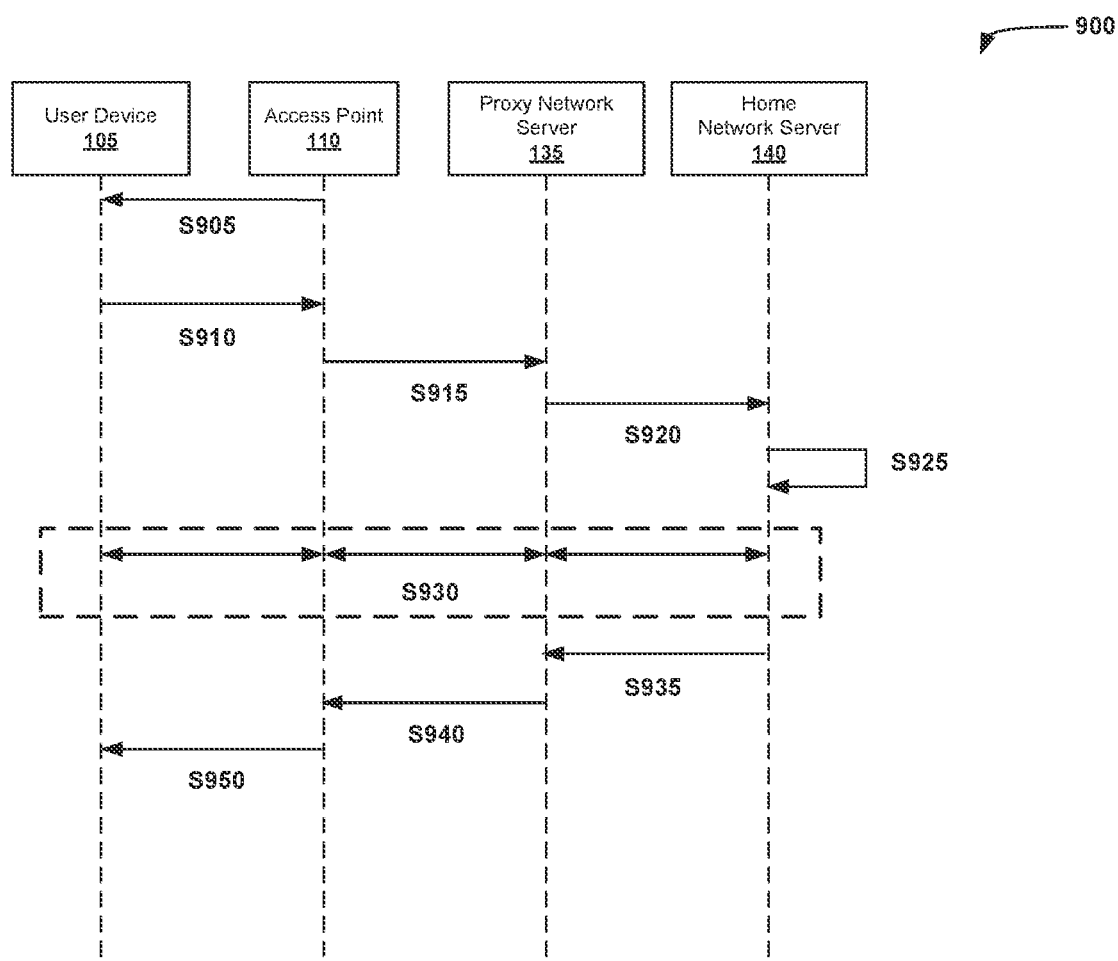
FIG. 9 is a data flow diagram of a process for connecting a roaming user device to a network using a network assigned permanent identifier.

FIG. 9 is a data flow diagram of a process 900 for connecting a roaming user device 105 to a network using a network assigned permanent identifier. Process 900 uses EAP, but other authentication protocols may be used with this process 900. In process 900, the user device 105 is attempting to access a subscription network.

In process 900, the home network server 140 has access to the registration database containing unique identifiers and authentication or login information. In Step S905, the access point 110 transmits an EAP Request for Identity to the user device 105. In Step S910, the user device 105 responds with an EAP Response for Identity that includes an authentication or login credentials and a randomized MAC address. In Step S915, the access point 110 transmits an access request to the proxy network server 135. The access request includes at least the authentication credentials. The access request can also include the randomized MAC address and an identifier for the access point 110. In Step S920, the proxy network server 135 forwards the access request to the home network server 140. The home network server 140 uses the authentication credentials to look up the unique identifier for the user device 105 in the database, in Step S925. The user device 105, the access point 110, the proxy network server 135, and the home network server 140 continue the authentication process in Step S930. When the authentication process has been successfully completed, the home network server 140 transmits the unique identifier to the proxy network server 135 in Step S935, such as in the access accept message. In Step S940, the proxy network server 135 forwards the unique identifier to the access point 110, such as in the access accept message. In Step S945, the access point 110 transmits an EAP success message to the user device 105. Both the proxy network server 135 and the access point 110 read the unique identifier from the message. The unique identifier is not transmitted over the air to the user device 105. The access point 110, the proxy network server 135, and potentially the home network server 140 associate the unique identifier with the provided random MAC address.

The proxy network server 135 stores the IP address of the access point 110, the random MAC address of the user device 105, the username, and the unique value. With this data the proxy network server 135 can track the user device 105 to continue to provide the user with access to the network. When the network server 135 or 140 receives an accounting packet, the network server 135 or 140 can add the unique identifier based on the MAC address, IP address of the access point 110, and the user name and can add the unique identifier to the packet. In this way, the network server 135 or 140 can provide network access and track the usage associated with the account associated with the unique identifier. When an accounting Stop packet is received, the network server 135 or 140 can delete the association record. In some embodiments, the database is periodically cleaned of stale association records.

The home network server 140 is configured to provide the same unique identifier each time the authentication credentials associated with an account are provided. The access point 110 maps the unique identifier with the randomized MAC address to have a stable identifier to provide access to the user device 105.

Process 900 can be applied to any operator SSID that authenticates the user, such as, but not limited to, web portals and EAP methods.

The network server 135 or 140 receives an access request S920 originating from a user device 105. The access request includes authentication information. The authentication information includes a randomized MAC address for the user device 105. The network server 135 or 140 compares the authentication information (e.g., step S925) to a database of registered devices to determine if the authentication information is in the database. The network server 135 or 140 determines an account based on the comparison. The network server 135 or 140 associates the randomized MAC address with the account. The network server 135 or 140 authorizes the access request based on the comparison. The network server 135 or 140 receives registration information for the user device 105. The network server 135 or 140 generates a unique identifier for the user device 105. The network server 135 or 140 stores the registration information and the unique identifier in the database. The network server 135 or 140 associates the randomized MAC address with the unique identifier. The network server 135 or 140 transmits the unique identifier to at least one of a proxy network server 135 and an access point 110 in communication with the user device 105. The network server 135 or 140 transmits the unique identifier in an access accept message. The access point 110 removes the unique identifier from the access accept message prior to transmitting the access accept message to the user device 105. The access request includes an IP address of an access point 110 in communication with the user device 105. The network server 135 or 140 associated the IP address with the account. The access request can be received from an access point in communication with the user device 110. The access request is received from a proxy server 135. The access request can be for an Extensible Authentication Protocol (EAP) authentication process.

The user device 105 can thus include at least one of a mobile device, a smart phone, a laptop, and a tablet. The access request can be a request for access to a Wi-Fi network, a request for Internet access, and a request for cellular access. The MAC address of the user device 110 is one of a hardware address, a manufacturer provided address, universally administered address, and a locally administered address.

The access point 110 transmits an identity request message to a user device 110. The access point 110 receives an identity response message from the user device 110. The identity response message includes authentication credentials and a randomized MAC address. The access point 110 transmits an access request message to a network server 135 or 135 for authentication. The access request message is based on the identity response message. The access point 110 receives an access accept message from the network server 135 and 140. The access accept message includes a unique identifier. The access point 110 associates the unique identifier with the randomized MAC address. The access point 110 modifies the access accept message to remove the unique identifier. The access point 110 then transmits the modified access accept message to the user device 105. The access point 110 adds an IP address of the access point 110, the randomized MAC address, and the authentication credentials to the access request message. The network server 135 or 140 compares the authentication credentials to a registration database including a plurality of sets of authentication credentials. Each set of authentication credentials is associated with a unique identifier. The identity request message is an Extensible Authentication Protocol (EAP) identity request message. The identity response message is an EAP response message. The user device 105 is one of a mobile device, a smart phone, a laptop, and a tablet. The access request message is a request for access to a Wi-Fi network, a request for Internet access, or a request for cellular access. The MAC address of the user device 110 is one of a hardware address, a manufacturer provided address, universally administered address, and a locally administered address.

The computer-implemented methods discussed herein may include additional, fewer, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, fewer, or alternate functionality, including such as that discussed elsewhere above. The computer systems discussed herein may include or be implemented via computer-executable instructions stored on non-transitory computer-readable media or medium.

Exemplary embodiments of systems and methods for providing real MAC addresses are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized with respect to downstream traffic, and in connection with other medication networks utilizing DOCSIS protocols or similarly compatible protocols.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. An access point, comprising:
a processor; and
a memory device (i) in communication with the processor, and configured to store computer executable instructions therein, which, when executed by the processor, cause the access point to:
receive, from a user device, a first association request message including a first randomized MAC address;

transmit the first MAC randomized address to a network server for authentication;
receive an authentication failed message from the network server;
transmit an association response message to the user device, wherein the association response message includes a request for a real MAC address;
receive, from the user device, a second association request message including an encrypted second MAC address;
transmit the encrypted second MAC address to the network server for authentication of the second association request message;
receive an authentication success message from the network server based on a decryption of the encrypted second MAC address; and
continue an association process based on the authentication success message.

2. The access point of claim 1, wherein the instructions further cause the access point to transmit an association accepted response to the user device.

3. The access point of claim 1, wherein the association process is an 802.11 association process.

4. The access point of claim 1, wherein the instructions further cause the access point to enable the network server to:
receive a third MAC address for authentication from the access point;
compare the received third MAC address to a database of registered devices to determine if the received third MAC address is in the database; and
transmit results of the comparison to the access point.

5. The access point of claim 1, wherein the instructions further cause the access point to enable the network server to:
receive a third MAC address and user identity for authentication from the access point;
compare the received third MAC address and user identity to a database of registered devices to determine if the received third MAC address and user identity combination is in the database; and
transmit results of the comparison to the access point.

6. The access point of claim 1, wherein the user device is one of a mobile device, a smart phone, a laptop, and a tablet.

7. The access point of claim 1, wherein the first association request message is a request for one of (i) access to a Wi-Fi network, (ii) Internet access, and (iii) cellular access.

8. The access point of claim 1, wherein the second encrypted MAC address of the user device is one of a hardware address, a manufacturer provided address, a universally administered address, and a locally administered address.

9. An access point, comprising:
a processor; and
a memory device (i) in communication with the processor, and configured to store computer executable instructions therein, which, when executed by the processor, cause the access point to:
transmit an identity request message to a user device;
receive an identity response message from the user device, wherein the identity response message includes authentication credentials and a randomized encrypted MAC address;
transmit an access request message to a network server for authentication, wherein the access request message is based on the identity response message;
receive an initial access accept message from the network server, wherein the initial access accept message includes a unique identifier and is based on a decryption of the randomized encrypted MAC address;
associate the unique identifier with the randomized encrypted MAC address;
modify the initial access accept message to remove the unique identifier; and
transmit the modified access accept message to the user device.

10. The access point of claim 9, wherein the instructions further cause the access point to add an IP address of the access point, the randomized encrypted MAC address, and the authentication credentials to the access request message.

11. The access point of claim 9, wherein the instructions further cause the access point to enable the network server to compare the authentication credentials to a registration database including a plurality of sets of authentication credentials, wherein each set of authentication credentials is associated with a respective unique identifier.

12. The access point of claim 9, wherein the identity request message is an Extensible Authentication Protocol (EAP) identity request message, and wherein the identity response message is an EAP response message.

13. The access point of claim 9, wherein the user device is one of a mobile device, a smart phone, a laptop, and a tablet.

14. The access point of claim 9, wherein the access request message is a request for one of (i) access to a Wi-Fi network, (ii) Internet access, and (iii) cellular access.

15. The access point of claim 9, wherein the randomized encrypted MAC address of the user device is one of a hardware address, a manufacturer provided address, universally administered address, and a locally administered address.

* * * * *